US008607938B2

(12) United States Patent
Lee

(10) Patent No.: US 8,607,938 B2
(45) Date of Patent: Dec. 17, 2013

(54) ELECTRIC PARKING BRAKE

(75) Inventor: Jae Hyun Lee, Gyeonggi-do (KR)

(73) Assignee: Mando Corporation, Gyeonggi-Do (KR)

( * ) Notice: Subject to any disclaimer, the term of this patent is extended or adjusted under 35 U.S.C. 154(b) by 140 days.

(21) Appl. No.: 13/106,534

(22) Filed: May 12, 2011

(65) Prior Publication Data

US 2011/0278114 A1 Nov. 17, 2011

(51) Int. Cl.
*F16D 65/14* (2006.01)
(52) U.S. Cl.
USPC .............................. 188/2 D; 188/162; 188/265
(58) Field of Classification Search
USPC .................. 188/2 D, 156, 72.8, 265, 162
See application file for complete search history.

(56) References Cited

U.S. PATENT DOCUMENTS

| | | | | |
|---|---|---|---|---|
| 5,590,744 | A * | 1/1997 | Belmond | 188/265 |
| 7,341,127 | B2 * | 3/2008 | Gil et al. | 188/2 D |
| 7,490,699 | B2 * | 2/2009 | Gil et al. | 188/2 D |
| 7,648,006 | B2 * | 1/2010 | Deutloff et al. | 188/2 D |
| 7,862,129 | B2 * | 1/2011 | Jeon | 303/2 |
| 8,051,956 | B2 * | 11/2011 | Huang et al. | 188/2 D |
| 8,210,326 | B2 * | 7/2012 | Kim | 188/158 |
| 8,235,181 | B2 * | 8/2012 | Sano et al. | 188/2 D |
| 2006/0289248 | A1 * | 12/2006 | Noh | 188/2 D |
| 2009/0247364 | A1 * | 10/2009 | Sano et al. | 477/197 |
| 2011/0308902 | A1 * | 12/2011 | Huang et al. | 188/2 D |

FOREIGN PATENT DOCUMENTS

| | | |
|---|---|---|
| CN | 1469824 A | 1/2004 |
| CN | 101018696 A | 8/2007 |
| DE | 100 43 739 A1 | 3/2002 |
| KR | 10-2008-0017909 | 2/2008 |

OTHER PUBLICATIONS

German Office Action with English Translation issued in German Application No. 10 2011 100 714.1 issued on Sep. 17, 2012.
Chinese Office Action, w/ English translation thereof, issued in Chinese Patent Application No. CN 201110122998.9 dated May 28, 2013.

* cited by examiner

*Primary Examiner* — Bradley King
(74) *Attorney, Agent, or Firm* — McDermott Will & Emery LLP

(57) ABSTRACT

Disclosed is an electric parking brake commonly used as a single puller type or a dual puller type. The electric parking brake includes an actuator housing; a parking cable connected to a brake that applies braking force to wheels of a vehicle; a motor generating driving force to operate the parking brake; a reduction gear unit for transferring power of the motor; a screw nut unit including a gear member connected to the gear reduction unit, a nut member connected to the gear member, and a screw member connected to a first parking cable of the parking cable while moving relative to the nut member; and a displacement sensor connected to the nut member of the screw nut unit. The displacement sensor includes a sensor housing, a magnet housing that moves relative to the sensor housing, a magnet elastic member elastically supported between the sensor housing and the magnet housing, a magnet provided in the magnet housing, and a hall IC provided in the sensor housing. The magnet housing is coupled with a second parking cable of the parking cable or the actuator housing.

8 Claims, 3 Drawing Sheets

ELECTRIC PARKING BRAKE

This application claims the benefit of Korean Patent Application No. 10-2010-0044700 filed on May 12, 2010, in the Korean Intellectual Property Office, the disclosure of which is incorporated herein by reference.

BACKGROUND

1. Field

The disclosure relates to an electric parking brake installed in a vehicle. More particularly, the disclosure relates to a cable puller type electric parking brake commonly used as a dual puller type or a single puller type.

2. Description of the Related Art

In general, an electric parking brake (EPB) applies braking force to wheels of a vehicle in order to prevent the wheels from being rotated in such a manner that the vehicle is not moved when the vehicle is parked.

Such an EPB is classified into a cable puller type EPB and a motor on caliper type EPB. The cable puller type EPB is further classified into a single puller type EPB and a dual puller type EPB. The single puller type EPB has an advantage in that the single puller type EPB can be easily installed in the vehicle as compared with the dual puller type EPB.

However, the cable puller type EPB according to the related art may not be commonly used as the single puller type and the dual puller type.

SUMMARY

Accordingly, it is an aspect of the disclosure to provide an EPB commonly used as a dual puller type or a single puller type.

Additional aspects and/or advantages of the disclosure will be set forth in part in the description which follows and, in part, will be apparent from the description, or may be learned by practice of the disclosure.

The foregoing and/or other aspects of the disclosure are achieved by providing an electric parking brake comprising: an actuator housing; a parking cable connected to a brake that applies braking force to wheels of a vehicle; a motor generating driving force to operate the parking brake; a reduction gear unit for transferring power of the motor; a screw nut unit including a gear member connected to the gear reduction unit, a nut member connected to the gear member, and a screw member connected to a first parking cable of the parking cable while moving relative to the nut member; and a displacement sensor connected to the nut member of the screw nut unit.

The displacement sensor includes a sensor housing, a magnet housing that moves relative to the sensor housing, a magnet elastic member elastically supported between the sensor housing and the magnet housing, a magnet provided in the magnet housing, and a hall IC provided in the sensor housing, and the magnet housing is coupled with a second parking cable of the parking cable or the actuator housing.

According to the disclosure, when the magnet housing is coupled with the second parking cable, a coupling part having a locking groove is formed in the magnet housing and a fasting part fitted with the locking groove of the coupling part is formed in the second parking cable.

According to the disclosure, when the magnet housing is coupled with the actuator housing, a coupling part having a locking groove is formed in the magnet housing and a fixing part fitted with the locking groove of the coupling part is formed in the actuator housing.

According to the disclosure, when the magnet housing is coupled with the actuator housing, a fixing cable is provided between the magnet housing and the actuator housing and the fixing cable is fixed to the actuator housing so as to be coupled with the magnet housing.

According to the disclosure, the electric parking brake further comprises a sensor latch between the sensor housing and the nut member, wherein the sensor latch is accommodated in the sensor housing while partially protruding out of the sensor housing and is connected to the nut member.

According to the disclosure, the displacement sensor causes a relative displacement between the sensor housing and the magnet housing by a driving force of the motor such that the magnet elastic member is compressed, and detects the relative displacement between the sensor housing and the magnet housing through the magnet and the hall sensor.

According to the disclosure, the electric parking brake is used as a dual puller type when the magnet housing is coupled with the second parking cable, and is used as a single puller type when the magnet housing is coupled with the actuator housing.

As described above, according to the electric parking brake of the disclosure, the second parking cable is connected to an end of the magnet housing of the displacement sensor when the electric parking brake is used as the dual puller type, and the magnet housing is directly fixed to the actuator housing or the fixing cable fixed to the actuator housing is connected to the magnet housing when the electric parking brake is used as the single puller type, so that the electric parking brake can be commonly used as the single puller type or the dual puller type.

BRIEF DESCRIPTION OF THE DRAWINGS

These and/or other aspects and advantages of the disclosure will become apparent and more readily appreciated from the following description of the embodiments, taken in conjunction with the accompanying drawings of which.

DETAILED DESCRIPTION OF THE EXEMPLARY EMBODIMENTS

Figure 1:
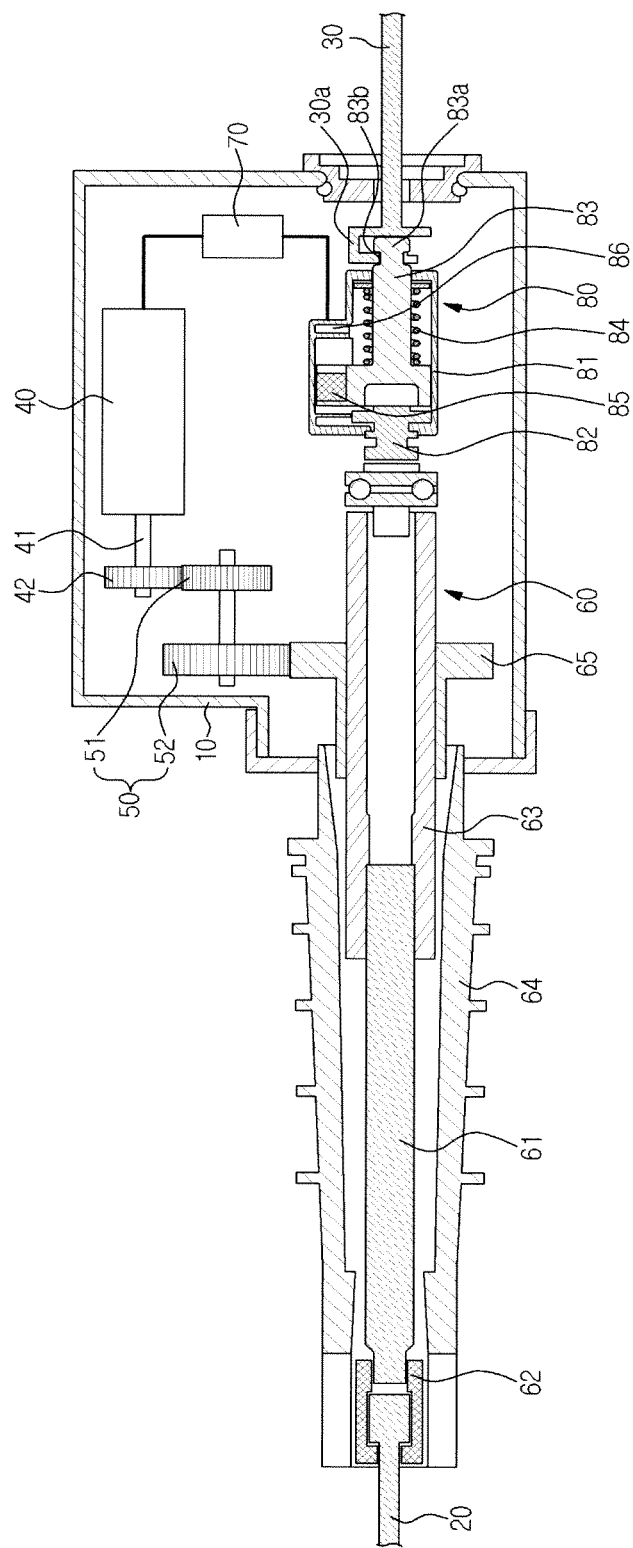
FIG. 1 is a sectional view showing a dual puller type EPB according to the disclosure.

Reference will now be made in detail to the embodiments of the disclosure, examples of which are illustrated in the accompanying drawings, wherein like reference numerals refer to the like elements. The embodiments are described below to explain the disclosure by referring to the figures.

As shown in FIG. 1, the EPB according to the disclosure includes an actuator housing 10 forming an external appearance of the EPB, first and second parking cables 20 and 30 connected to a brake that applies braking force to wheels of a vehicle, a motor 40 generating driving force to operate the first and second parking cables 20 and 30, a reduction gear unit 50 coupled to a rotating shaft of the motor 40 to transmit power, a screw nut unit 60 coupled to the reduction gear unit 50, and a control unit 70 for controlling the operation of the motor 40.

As described above, the actuator housing 10 forms the external appearance of the EPB and is provided therein with the motor 40, the reduction gear unit 50, a part of the screw nut unit 60 and the control unit 70.

The motor 40 is driven as power is applied thereto from the outside. The motor 40 includes the rotating shaft 41 integrally coupled with a driving gear 42.

As shown in FIG. 1, the reduction gear unit 50 includes a first gear 51 engaged with the driving gear 42, and a second gear 52 rotated according to rotation of the first gear 51 and engaged with a gear member 65 of the screw nut unit 60, which will be described later in detail.

According to the embodiment of the disclosure, as shown in FIG. 1, the reduction gear unit 50 may include various gear assemblies, such as planet gear assemblies, as well as a spur gear assembly to reduce the driving force of the motor 40.

The screw nut unit 60 is operated in cooperation with the reduction gear unit 50 to pull or release the first and second parking cables 20 and 30. The screw nut unit 60 includes a screw member 61, a nut member 63 screw-coupled with the screw member 61, and a gear member mounted on an outer surface of the nut member 63.

One end of the screw member 61 is connected to the first parking cable 20 through a connection member 62. The screw member 61 is screw-coupled with the nut member 63 as described above. To this end, a male screw is formed on an outer surface of the screw member 61.

In addition, a female screw is formed on an inner surface of the nut member 63 such that the screw member 61 can be screw-coupled into the nut member 63. As shown in FIG. 1, a displacement sensor 80 is connected to an end of the nut member 63 in opposition to screw member 61.

As described above, the gear member 65 is mounted on the outer surface of the nut member 63. The gear member 65 is engaged with the second gear 52 of the reduction gear unit 50 to receive the driving force of the motor 40 through the reduction gear unit 50.

Reference numeral 64 is a housing of the screw nut unit 60, which protrudes out of the actuator housing 10 to accommodate the screw member 61 therein.

Figure 2:
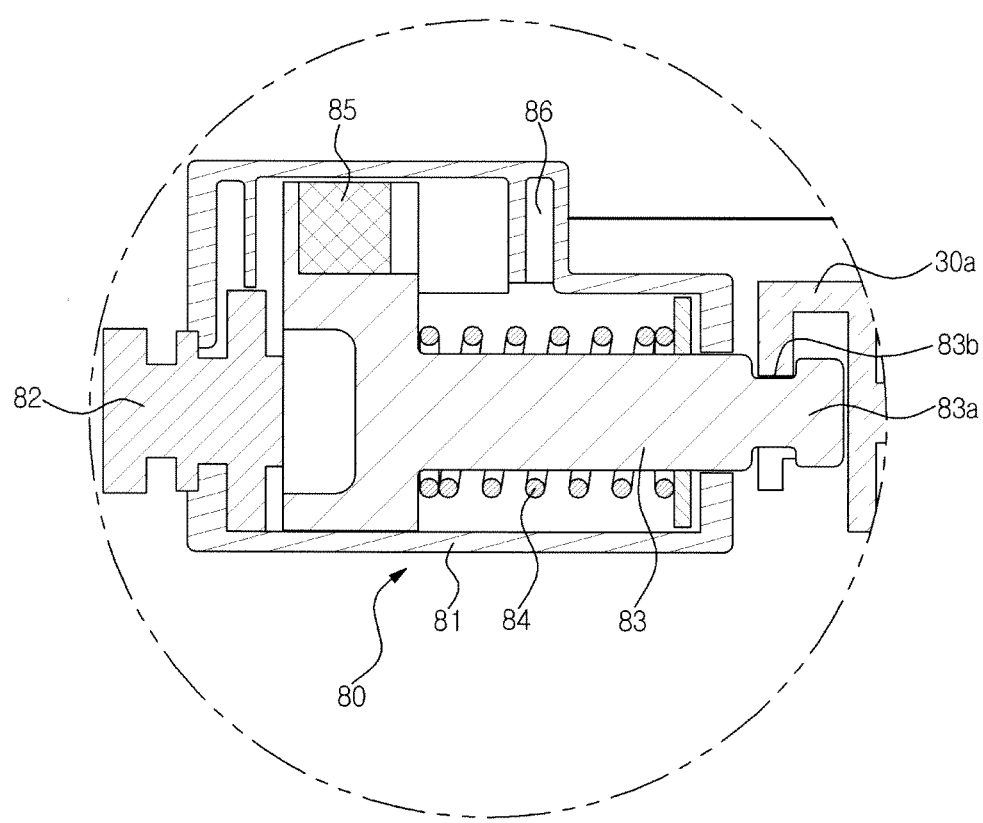
FIG. 2 is an enlarged view of a displacement sensor shown in FIG. 1.

The displacement sensor 80 detects the intensity of force applied to the first and second parking cables 20 and 30 according to the operation of the screw nut unit 60 and transfers the signal to the control unit 70. As shown in FIG. 2, the displacement sensor 80 includes a sensor housing 81, a sensor latch 82, a magnet housing 83, a magnet elastic member 84, a magnet 85 and a hall IC 86.

As shown in the drawings, the sensor latch 82 partially protrudes from the sensor housing 81 and is connected to the other end of the nut member 63 so as to move according to the movement of the nut member 63. Preferably, a bearing is installed between the nut member 63 and the sensor latch 82. In this case, the sensor latch 82 may not rotate together with the nut member 63 due to the bearing, but move according to the movement of the nut member 63.

As shown in the drawings, the magnet housing 83 is movable in the sensor housing 81 and elastically supported by the magnet elastic member 84. The magnet housing 83 partially protrudes toward the other end of the sensor housing 81 and the second parking cable 30 is connected to a protrusion of the magnet housing 83 that protrudes toward the other end of the sensor housing 81. In addition, the magnet housing 83 is moved by repulsive force of the nut member 63 according to the movement of the screw member 61.

The magnet housing 83 is provided with a coupling part 83*a* having a locking groove 83*b* so as to be coupled with the second parking cable 30. The second parking cable 30 is provided with a fastening part 30*a* inserted into the locking groove 83*b* so as to be coupled with the coupling part 83*a*. In more detail, a lower portion of the fastening part 30*a* is open and the coupling part 83*a* of the magnet housing 83 is inserted into the opening of the fastening part 30*a*. In addition, a perforation hole (not shown) is formed in the fastening part 30*a* in such a manner that a part of the magnet housing 83 formed with the locking groove 83*b* can be press-fitted into the perforation hole.

The magnet 85 is provided at one side of the magnet housing 83, and the hall IC 86 detects the variation of magnetic field according to the movement of the magnet 85 and transfers the electric signal to the control unit 70.

In detail, according to the disclosure, when the nut member 63 is moved due to the rotational force of the motor 40, the sensor housing 81 is moved by the sensor latch 82. In addition, the relative displacement between the sensor housing 81 and the magnet housing 83 is detected by using the magnet 85 and the hall IC 86.

The control unit 70 controls various operations of the motor 40, such as driving, stopping, forward rotating and revere rotating, based on the command of the driver and the electric signal transmitted thereto from the displacement sensor 80.

Figure 3:
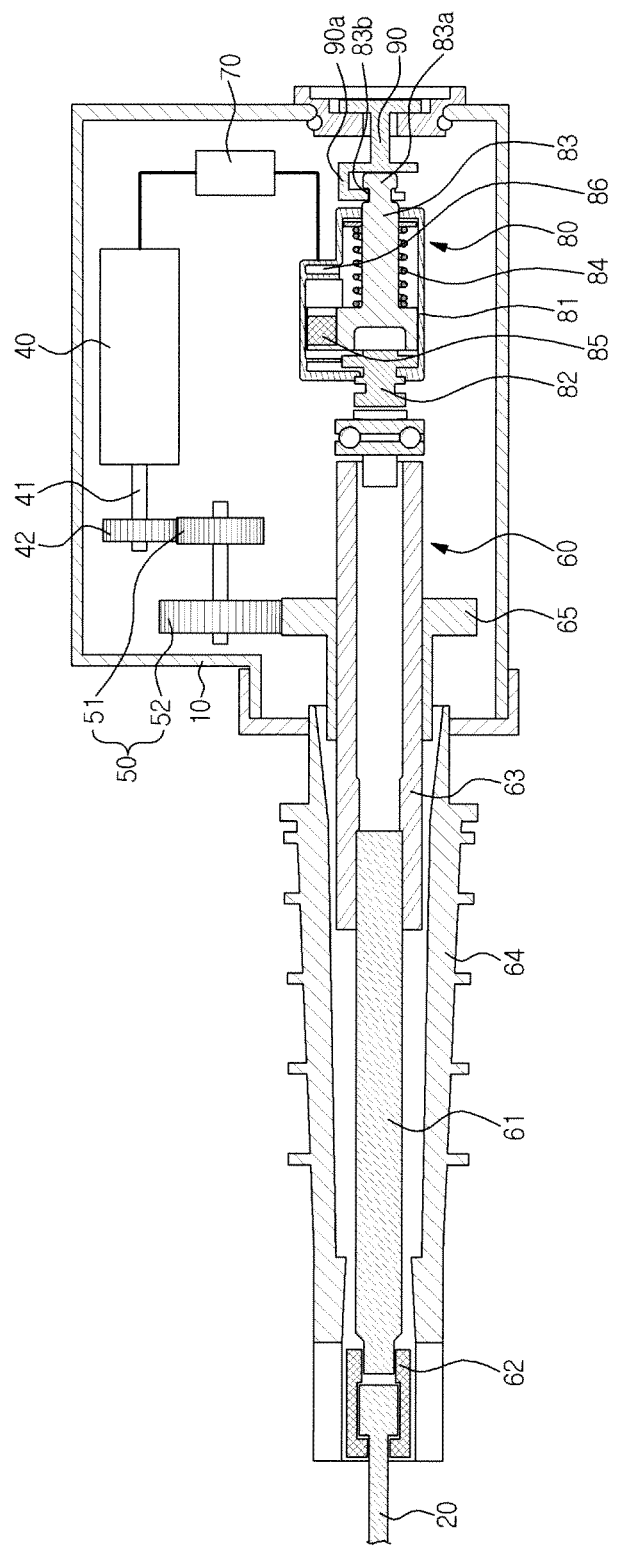
FIG. 3 is a sectional view showing a single puller type EPB according to the disclosure.

The EPB according to the disclosure can be used as the single puller type EPB as shown in FIG. 3 as well as the dual puller type EPB shown in FIG. 1. Hereinafter, the single puller type EPB will be described with reference to FIG. 3, in which the same reference numerals will be assigned to the same elements and detailed description thereof will be omitted in order to avoid redundancy.

As shown in FIG. 3, in order to use the EPB according to the disclosure as the single puller type EPB, the displacement sensor 80 is fixed to the actuator housing 10. To this end, a fixing cable 90 is connected between the other end of the magnet housing 83 of the displacement sensor 80 and the other end of the actuator housing 10. In detail, the single puller type EPB can be obtained by fixing the magnet housing 83 of the displacement sensor 80 to the actuator housing 10 through the fixing cable 90.

Since the coupling part 83*a* having the locking groove 83*b* is formed in the magnet housing 83, the magnet housing 83 can be connected to the fixing cable 90. In detail, as shown in the drawings, a fixing part 90*a* coupled with the coupling part 83*a* is provided in the fixing cable 90. The fixing part 90*a* has the structure the same as that of the fastening part 30*a* of the second parking cable 30, which is coupled with the coupling part 83*a* of the magnet housing 83 in the dual puller type EPB, so the detailed description thereof will be omitted below.

Meanwhile, although the magnet housing 83 is coupled to the second parking cable 30 or the fixing cable 90, the disclosure is not limited thereto. For instance, the magnet housing 83 can be directly coupled with the actuator housing 10. In other words, if the EPB according to the disclosure is used as the single puller type EPB, the magnet housing 83 is needed to be fixed. In this regard, the magnet housing 83 is fixed to the actuator housing 10 without using the fixing cable 90. To this end, although not shown in the drawings, a fixing part coupled with the coupling part 83*a* of the magnet housing 83 has to be provided in the actuator housing 10.

Hereinafter, the operation of the EPB according to the disclosure will be described with reference to accompanying drawings.

First, in the case of the dual puller type EPB, if the brake operating command is applied through the control unit 70, the motor 40 is driven in the predetermined direction, for instance, in the forward direction. As the motor 40 is driven, the driving gear 42 rotates the reduction gear unit 50. In addition, the reduction gear unit 50 rotates the gear member 65 and the nut member 63 of the screw nut unit 60.

As the nut member 63 rotates, the male screw of the screw member 61 engaged with the female screw of the nut member 63 may move along the female screw, so that the first parking cable 20 connected to one end of the screw member 61 is pulled.

At the same time, the nut member 63 moves corresponding to the movement of the screw member 61 in the direction opposite to the movement direction of the screw member 61, so that the second parking cable 30 connected to the other end of the displacement sensor 80 is pulled according to the movement of the nut member 63.

As the first and second parking cables 20 and 30 are operated, the brakes coupled to the first and second parking cables 20 and 30 are operated, so that the braking force is applied to the wheels.

Meanwhile, in the case of the single puller type EPB, the magnet housing 83 of the displacement sensor 80 is directly fixed to the actuator housing 10 or fixed to the other end of the actuator housing 10 through the fixing cable 90, so that only the first parking cable 20 is pulled. At this time, although the magnet housing 83 is fixed, the sensor housing 81 is moved while compressing the magnet elastic member 84, so that the relative displacement between the sensor housing 81 and the magnet housing 83 can be measured through the magnet 85 and the hall IC 86.

Therefore, according to the disclosure, the second parking cable 30 or the fixing cable 90 is selectively connected to the magnet housing 83 of the displacement sensor 80, or the magnet housing 83 is directly fixed to the actuator housing 10 according to the application of the EPB, so that the EPB can be commonly used as the dual puller type EPB or the single puller type EPB.

Although few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. An electric parking brake comprising:
    an actuator housing;
    a parking cable connected to a brake that applies braking force to wheels of a vehicle;
    a motor generating driving force to operate the parking brake;
    a reduction gear unit for transferring power of the motor;
    a screw nut unit including a gear member connected to the gear reduction unit, a nut member connected to the gear member, and a screw member connected to a first parking cable of the parking cable while moving relative to the nut member; and
    a displacement sensor connected to the nut member of the screw nut unit,
    wherein the displacement sensor includes a sensor housing, a magnet housing that moves relative to the sensor housing, a magnet elastic member elastically supported between the sensor housing and the magnet housing, a magnet provided in the magnet housing, and a hall IC provided in the sensor housing,
    wherein the magnet housing includes a coupling part located outside of the sensor housing, and said magnet housing is coupled with a second parking cable of the parking cable or the actuator housing via said coupling part, and
    wherein the coupling part includes a locking groove formed in an outer peripheral surface of the magnet housing.

2. The electric parking brake of claim 1, wherein the magnet housing is coupled with the second parking cable, and a fastening part fitted with the locking groove of the coupling part is formed in the second parking cable.

3. The electric parking brake of claim 1, wherein the magnet housing is coupled with the actuator housing, and a fixing part fitted with the locking groove of the coupling part is formed in the actuator housing.

4. The electric parking brake of claim 1, wherein the magnet housing is coupled with the actuator housing, a fixing cable is provided between the magnet housing and the actuator housing, and the fixing cable is fixed to the actuator housing so as to be coupled with the magnet housing.

5. The electric parking brake of claim 1, further comprising a sensor latch between the sensor housing and the nut member, wherein the sensor latch is accommodated in the sensor housing while partially protruding out of the sensor housing and is connected to the nut member.

6. The electric parking brake of claim 1, wherein the displacement sensor causes a relative displacement between the sensor housing and the magnet housing by a driving force of the motor such that the magnet elastic member is compressed, and detects the relative displacement between the sensor housing and the magnet housing through the magnet and the hall IC.

7. The electric parking brake of claim 1, wherein the magnet housing is coupled with the second parking cable.

8. The electric parking brake of claim 1, wherein the magnet housing is coupled with the actuator housing.

* * * * *